(12) United States Patent
Ducher

(10) Patent No.: US 12,311,734 B2
(45) Date of Patent: May 27, 2025

(54) POWER MANAGEMENT SYSTEM FOR A TRANSPORT REFRIGERATION UNIT

(71) Applicant: Carrier Corporation, Palm Beach Gardens, FL (US)

(72) Inventor: Gael Ducher, Olivet (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 303 days.

(21) Appl. No.: 17/833,177

(22) Filed: Jun. 6, 2022

(65) Prior Publication Data
US 2022/0388371 A1 Dec. 8, 2022

(30) Foreign Application Priority Data
Jun. 8, 2021 (EP) .................................... 21178370

(51) Int. Cl.
*B60H 1/00* (2006.01)
*B60P 3/20* (2006.01)
(Continued)

(52) U.S. Cl.
CPC ....... *B60H 1/00764* (2013.01); *B60H 1/0045* (2013.01); *B60P 3/20* (2013.01); *B60R 16/033* (2013.01); *H02J 7/0068* (2013.01)

(58) Field of Classification Search
CPC .............. B60H 1/00764; B60H 1/0045; B60H 1/3232; B60H 1/00428; B60P 3/20;
(Continued)

(56) References Cited

U.S. PATENT DOCUMENTS 6,840,055 B2 * 1/2005 Iritani ................ B60H 1/00428
62/134
7,743,616 B2 6/2010 Renken et al.
(Continued)

FOREIGN PATENT DOCUMENTS

CA 2457216 A1 8/2004
CN 100402330 C 7/2008
(Continued)

OTHER PUBLICATIONS

WO-2020072706-A1 English Translation (Year: 2020).*
(Continued)

*Primary Examiner* — James A Shriver, II
*Assistant Examiner* — Michael T. Walsh
(74) *Attorney, Agent, or Firm* — CANTOR COLBURN LLP

(57) ABSTRACT

A vehicle (100) for transporting goods includes a transport refrigeration unit (150); an engine (110); and a power management system (200; 300; 400). The power management system (200; 300; 400) includes a battery unit (240; 340; 440) electrically connected to the transport refrigeration unit (150); and a generator (230; 330; 430) mechanically connected to the engine (110), the generator (230; 330; 430) being configured to be mechanically driven by the engine (110) and to supply electrical power to the battery unit (240; 340; 440). The power management system (200; 300; 400) is configured to supply electrical power to the transport refrigeration unit (150) from the battery unit (240; 340; 440) responsive to a power demand of the transport refrigeration unit (150).

10 Claims, 4 Drawing Sheets

(51) Int. Cl.
  *B60R 16/033* (2006.01)
  *H02J 7/00* (2006.01)
(58) Field of Classification Search
  CPC ...... B60R 16/033; B60R 16/03; H02J 7/0068;
   B60K 25/02
  See application file for complete search history.

(56) References Cited

U.S. PATENT DOCUMENTS

| | | | |
|---|---|---|---|
| 8,776,928 B2 | 7/2014 | Stover, Jr. et al. | |
| 9,194,286 B2 | 11/2015 | Burnham et al. | |
| 9,389,007 B1 | 7/2016 | McKay | |
| 9,415,660 B2 | 8/2016 | Koelsch | |
| 9,694,712 B2 | 7/2017 | Healy | |
| 10,766,478 B2 | 9/2020 | Healy et al. | |
| 10,821,853 B2 | 11/2020 | Healy et al. | |
| 10,889,288 B2 | 1/2021 | Richter et al. | |
| 10,899,192 B2 * | 1/2021 | Larson | B60H 1/00014 |
| 11,104,230 B2 * | 8/2021 | Lavrich | B60L 1/003 |
| 11,479,144 B2 | 10/2022 | Healy et al. | |
| 11,554,638 B2 * | 1/2023 | Schumacher | B60H 1/0045 |
| 11,884,124 B2 | 1/2024 | Noland | |
| 2002/0193203 A1 * | 12/2002 | Lohr | F16D 48/06 477/74 |
| 2005/0000739 A1 | 1/2005 | Leclerc | |
| 2007/0272116 A1 | 11/2007 | Bartley et al. | |
| 2008/0174174 A1 | 7/2008 | Burns et al. | |
| 2011/0042154 A1 | 2/2011 | Bartel | |
| 2011/0094807 A1 | 4/2011 | Pruitt et al. | |
| 2015/0076949 A1 | 3/2015 | Alim | |
| 2015/0246593 A1 | 9/2015 | Larson et al. | |
| 2017/0217280 A1 | 8/2017 | Larson et al. | |
| 2018/0264951 A1 | 9/2018 | Kooi | |
| 2019/0070944 A1 | 3/2019 | Soto | |
| 2019/0329650 A1 | 10/2019 | Quill | |
| 2020/0141746 A1 | 5/2020 | Srnec et al. | |
| 2020/0180496 A1 | 6/2020 | Burchill et al. | |
| 2020/0189361 A1 * | 6/2020 | Radcliff | B60H 1/00771 |
| 2020/0353806 A1 | 11/2020 | Knoche et al. | |
| 2020/0391574 A1 | 12/2020 | Ducher | |
| 2021/0252947 A1 * | 8/2021 | She | B60H 1/00428 |
| 2023/0344308 A1 * | 10/2023 | Stubbs | H02J 7/35 |
| 2023/0347872 A1 | 11/2023 | Gesang et al. | |

FOREIGN PATENT DOCUMENTS

| | | | | |
|---|---|---|---|---|
| EP | 3437913 B1 | 1/2020 | | |
| EP | 3647087 A1 | 5/2020 | | |
| EP | 3647088 A1 | 5/2020 | | |
| FR | 3032166 B1 | 2/2017 | | |
| WO | WO-2009109825 A1 * | 9/2009 | | B60K 6/48 |
| WO | 2019219997 A1 | 11/2019 | | |
| WO | 2019229490 A1 | 12/2019 | | |
| WO | 2020068475 A1 | 4/2020 | | |
| WO | 2020068556 A1 | 4/2020 | | |
| WO | 2020068637 A1 | 4/2020 | | |
| WO | 2020069107 A1 | 4/2020 | | |
| WO | WO-2020072706 A1 * | 4/2020 | | B60H 1/00428 |
| WO | WO-2021127647 A1 * | 6/2021 | | B60H 1/00428 |

OTHER PUBLICATIONS

WO-2021127647-A1 English Translation (Year: 2021).*
WO-2009109825-A1 English Translation (Year: 2009).*
European Search Report for Application No. 21167032.8; Issued Octboer 13, 2021; 5 Pages.
European Search Report for Application No. 21178370.9; Issued Nov. 29, 2021; 8 Pages.

* cited by examiner

POWER MANAGEMENT SYSTEM FOR A TRANSPORT REFRIGERATION UNIT

FOREIGN PRIORITY

This application claims priority to European Patent Application No. 21178370.9, filed Jun. 8, 2021, and all the benefits accruing therefrom under 35 U.S.C. § 119, the contents of which in its entirety are herein incorporated by reference.

TECHNICAL FIELD OF INVENTION

The present invention relates to a vehicle for transporting goods, and a method of powering a transport refrigeration unit.

BACKGROUND OF THE INVENTION

Transport refrigeration units (TRUs) transport perishable or temperature-sensitive goods and consumables within logistics networks. TRUs generally regulate a monitored environment within a storage area, such as a container or trailer of a vehicle, where the goods are to be stored during transit. The monitored environment is regulated using a refrigeration system or the like, which in turn is powered by an energy source. So that the TRU is able to adequately regulate the monitored environment and hence preserve the goods it transports, the energy source is required to provide a stable source of power to the TRU.

One such stable energy source which is used to power a TRU is a generator driven hydraulically by the internal combustion engine of the vehicle which houses the TRU. Due to the engine driving the generator via a hydraulic mechanism, the generator speed remains substantially constant such that the electrical power generated by the generator remains stable. As such the TRU is reliably powered by the generator.

The hydraulic mechanism generally comprises a hydraulic pump coupled to the engine, and a hydraulic motor connected to the generator. Hydraulic lines run between the hydraulic pump and the hydraulic motor, and thus complete a fluid circuit. As the engine runs, the hydraulic pump is driven at a varying speed. However, the displacement of the hydraulic pump (i.e. the pump stroke) can be varied such that a constant pressure and flow is maintained at the hydraulic motor. Accordingly, the generator can always be driven at a stable speed, which in turn results in the generator generating a stable source of power for the TRU.

Whilst existing TRU systems are suitable for their intended purpose, a demand exists for improved TRU systems.

SUMMARY OF THE INVENTION

Viewed from a first aspect of the present invention, there is provided a vehicle for transporting goods, the vehicle comprising: a transport refrigeration unit; an engine; and a power management system comprising: a battery unit electrically connected to the transport refrigeration unit; and a generator mechanically connected to the engine, the generator being configured to be mechanically driven by the engine and to supply electrical power to the battery unit; wherein the power management system is configured to supply electrical power to the transport refrigeration unit from the battery unit responsive to a power demand of the transport refrigeration unit.

By mechanically driving the generator using the engine, the generator being mechanically connected to the engine, the rate at which the generator generates electrical power will depend on a speed of the engine. Accordingly when the engine speed increases/decreases, the electricity generation rate of the generator will also correspondingly increase/decrease.

The power management system is configured to use a battery unit to harvest the generated power, and to supply electrical power to the transport refrigeration unit (TRU) from the battery unit responsive to a power demand of the TRU. Consequently, the requisite power to maintain a desired output of the TRU can be met. That is, the power management system may dynamically output power as required by the TRU.

Accordingly, an environment of the vehicle in which goods are transported (i.e. a portion of the vehicle regulated by the TRU) can be effectively regulated and hence a condition of the goods may be reliably preserved.

The provision of a power management system which is configured to supply power to the TRU responsive to a power demand of the TRU removes the need to provide a mechanism between the engine and the generator which maintains a substantially constant, or sustained, generator speed (and hence a substantially constant, or sustained, electrical power output at the generator). As such, it is not necessary to provide mechanisms, such as a hydraulic mechanism, which maintains a constant speed output at the generator, when driven by the engine. Mechanically driving the generator by a mechanical connection to the engine rather than a hydraulic mechanism may have a number of advantages. For example, mechanically connecting the generator to the engine may be generally cheaper than a hydraulic connection, and hence the cost of the vehicle components may be reduced. Further, mechanical connections may be less complex in regards to their installation and/or maintenance when compared to hydraulic connections, and hence costs associated in each of these regards may also be reduced.

The phrase 'mechanically driven' means that the generator is configured to be driven by the engine via a mechanical interconnection. That is, the generator may be driven by the engine via the physical interaction of one or more solid bodies, such as gears, shafts, linkages and the like. Specifically, the mechanical connection does not use electrical, hydraulic or pneumatic connections to transmit the driving energy from the engine to the generator. The generator may be driven solely by its mechanical connection to the engine, which is facilitated by the one or more solid bodies and their physical interactions therein.

The generator may not be hydraulically connected to, or hydraulically driven by, the engine. The generator may not comprise a hydraulic mechanism. The engine may not transfer mechanical energy to the generator, or drive the generator, using at least one of: a hydraulic pump; a hydraulic motor; and a hydraulic transmission line.

Hydraulic mechanisms, such as hydraulic pumps and motors, are generally expensive and therefore vehicles which do not use hydraulic mechanisms to drive generators may cost less to manufacture. Further, given the complexity of installing hydraulic mechanisms and/or systems, costs associated with their installation may also be significant. The provision of the battery unit, which itself provides the stable source of power for the TRU, removes the need for a mechanism, such as the hydraulic mechanism, which drives the generator at a constant speed. Accordingly the vehicle of the first aspect can provide a generator mechanically connected to and mechanically driven by the engine, which is a system that may be cheaper to install and maintain.

The engine may comprise a power take off, and the engine may be configured to mechanically drive the generator via the power take-off. The power take-off may be a drive shaft connected to a rotor of the engine. The generator may be directly mechanically coupled to the power take-off.

The power management system may be configured to receive a variable supply of electrical power from the generator. As the generator is mechanically driven by the power take-off, the speed of the generator will be dependent on the speed of the power take-off (i.e. the engine speed). An electricity generation rate, i.e. a rate at which the generator generates electrical power, may depend on the engine speed. Generally, the generation rate may increase proportionally with the engine speed. Accordingly the generation rate of the generator may vary with the engine speed.

The engine may operate at an engine speed at least equal to, or greater, than an engine idle speed. The engine idle speed will be understood to be the rotational speed of the engine when the engine is idling (i.e. when the vehicle is not in motion, but the engine is running). The engine idle speed may be at least 500 rpm; at least 600 rpm; at least 700 rpm; at least 800 rpm; at least 900 rpm; or at least 1000 rpm.

The generator may be coupled to the engine via a gearing arrangement. The gearing arrangement may increase the speed at which the generator is driven by the engine. The gearing arrangement may be coupled to the power-take off, and may also be coupled to the generator. That is, the gearing arrangement may be located between the power take-off and the generator. The gearing arrangement may be a fixed speed gearing arrangement. Alternatively the gearing arrangement may be a variable speed gearing arrangement.

The gearing arrangement may be configured to increase the speed at which the generator is driven, such that the generator is driven at a speed greater than a minimum speed threshold. The minimum speed threshold may be a minimum speed at which the generator generates electrical power. The minimum speed threshold may be a synchronous speed of the generator. The gearing arrangement may be configured such that the generator is driven at a speed at which electrical power is always generated by the generator when the engine is operating at least at the engine idle speed. A gear ratio of the gearing arrangement may be selected such that the generator is driven at a speed greater than the minimum speed threshold when the engine is idling.

The minimum speed threshold may be at least 800 rpm; at least 900 rpm; at least 1000 rpm; at least 1100 rpm; at least 1200 rpm; at least 1300 rpm; at least 1400 rpm; or at least 1500 rpm.

The gearing arrangement may improve the compatibility of off-the-shelf generators with the engine. For example, if a generator is not directly compatible with the engine e.g. when running at the engine idle speed, a gearing arrangement may be introduced to ensure that the generator is driven above a minimum speed required for the generator to operate as intended, e.g. such that the generator is driven at a speed at which the generator at least generates electrical power.

In other configurations, the generator may be connected to the engine via a drive belt or a similar mechanism. For example, the drive belt may be driven by a drive shaft or a power take-off of the engine, and may drive a drive shaft of the generator.

The generator may be coupled to the engine via a clutch, and may be coupled to the power take-off via the clutch. The clutch may be configured to decouple the generator from the engine when the clutch is engaged, and may be configured to couple the generator to the engine when the clutch is disengaged.

By being able to engage or disengage the generator from the clutch, the generator may be decoupled from and/or coupled to the engine according to one or more modes of operation of the vehicle and/or the power management system. This may avoid damage to the generator, or inefficient operation of the generator, which may otherwise decrease the operational lifetime of the generator. Further, in situations in which the generator need not be coupled to the power take-off, such as when the battery unit has above a threshold level of charge, the clutch may be engaged such that an amount of work the engine is required to perform may be reduced. Accordingly the rate at which the engine consumes fuel may be reduced. Further, decoupling the engine from the generator need not be of detriment to the operation of the TRU, as the battery unit will supply power to the TRU responsive to the power demand of the TRU.

It will be appreciated that the vehicle will be able to decouple the generator from the clutch without necessarily being of detriment to the ability of the vehicle to provide a stable source of power to the TRU, due to the provision of the battery unit. This is in contrast to prior configurations, which require that the generator is always coupled to the engine e.g. via a hydraulic mechanism. Thus the vehicle may be able to reduce an overall consumption of fuel by decoupling the generator from the engine at instances where the generator does not need to be coupled to the engine.

The power management system may comprise a controller. The controller may be configured to operate the clutch. The controller may operate the clutch according to a determined state of the vehicle.

The controller may be configured to monitor a speed of the vehicle. The controller may be configured to determine that the vehicle is in a first state and engage the clutch when the vehicle is in the first state, wherein the speed of the vehicle is increasing in the first state.

The controller may be configured to determine that the vehicle is in a second state and disengage the clutch when the vehicle is in the second state, wherein the speed of the vehicle is substantially constant in the second state.

When coupled to the engine the generator can be driven by the engine such that electrical power is generated. However, driving the generator using the engine increases the amount of work done by the engine, and accordingly a rate at which the engine consumes fuel may increase. During acceleration, engine fuel efficiency typically decreases, meaning that driving the generator during acceleration of the vehicle further reduces the effective fuel efficiency of the engine.

By monitoring if the speed of the vehicle is increasing, the power management system may selectively couple or decouple the generator from the engine via operation of the clutch. When the speed of the vehicle is substantially constant, i.e. the vehicle is not accelerating or decelerating, the vehicle may be in a suitable state for electricity to be generated, e.g. to power the TRU. However, when the speed of the vehicle is increasing the generator may be decoupled from the engine such that the amount of work done by the engine may decrease during acceleration of the vehicle, and hence fuel consumption during acceleration of the vehicle may also be reduced. As a result, the fuel efficiency of the vehicle may be increased.

Thus, in the first state the speed of the vehicle may be increasing, and in the second state, the speed of vehicle may not be increasing, i.e. it may be substantially constant or may be decreasing.

The speed of the vehicle may be determined to be increasing when the rate of change of speed of the vehicle is greater than at least 0.1 m/s2, at least 0.2 m/s2, at least 0.3 m/s2, at least 0.4 m/s2, at least 0.5 m/s2. The rate of change of speed of the vehicle may be determined to be substantially zero, i.e. the vehicle speed may be determined to be substantially constant, for example, when the magnitude of the rate of change of speed of the vehicle is no greater than 0.1 m/s2, at most 0.2 m/s2, at most 0.3 m/s2, at most 0.4 m/s2, or at most 0.5 m/s2, respectively. The vehicle speed may alternatively be considered substantially constant if fluctuations within a predetermined time period are within a certain tolerance. The time period may be less than 1 minute, less than 30 seconds, or less than 10 seconds. The fluctuation tolerance may be a percentage range of the vehicle speed, where the percentage value may be less than 1%, less than 2%, less than 3%, less than 4% or less than 5%. Alternatively, the fluctuation tolerance may be a numerical range, where the tolerance may span a range less than 1 m/s, less than 2 m/s, less than 3 m/s, less than 4 m/s or less than 5 m/s.

By only determining that the vehicle is accelerating when the acceleration of the vehicle is greater than a set threshold, small fluctuations of the vehicle speed, e.g. due to accelerator pedal control by a driver of the vehicle, may be disregarded and the ride may be smoother due to the power management system not rapidly coupling and decoupling the generator to and from the engine via operation of the clutch.

If the vehicle is decelerating or remains at constant speed due to driver intervention (i.e. braking, or braking when travelling downhill), it is desirable to generate energy using the generator as the work done by the engine during this time is reduced.

The controller may therefore be configured to monitor if the vehicle is braking, for example by monitoring a brake pedal position of the vehicle. The controller may be configured to determine that the vehicle is in a third state and disengage the clutch when the vehicle is in the third state, wherein the vehicle is braking (e.g. the brake pedal is engaged) in the third state.

Brake pedal position will be understood to be the position of the brake pedal of the vehicle. When the brake pedal is engaged, the braking system of the vehicle will be activated such that the vehicle system may decelerate, i.e. its rate of change of speed will be substantially less than zero. During braking, energy is lost from the vehicle system. Rather than dissipating all the energy via friction in the brakes, the power management may instead disengage the clutch such that energy which would otherwise be lost during braking may be instead be regenerated via the generator being driven by the engine. It will be appreciated that driving the generator using the engine when the vehicle is braking may provide a form of regenerative braking.

The controller may be configured to monitor a power level of the battery unit. The controller may be configured to determine that the vehicle is in a fourth state and disengage the clutch when the vehicle is in the fourth state, wherein the power level of the battery unit is below a first threshold in the fourth state. The controller may be configured to determine that the vehicle is in a fifth state and engage the clutch when the vehicle is in the fifth state, wherein the power level of the battery unit is above a second threshold in the fifth state.

The vehicle may be determined to be in the fourth state regardless of if the speed of the vehicle is determined to be increasing. In this way, the adequate powering of the TRU may be prioritised over preserving the fuel efficiency of the vehicle.

Additionally, the vehicle may be determined to be in the third state even if the power level of the battery unit is greater than the second threshold. In this way, electrical power may be generated even if the battery unit is sufficiently charged. The power level of the battery unit may either be conserved, or any surplus electrical power may be delivered to and/or dissipated within other components of the power management system and/or the vehicle. Accordingly electrical power is always generated by the generator when it is not of detriment to the fuel efficiency of the vehicle.

The first threshold may be regarded as a minimally acceptable value for the power level (i.e. a state-of-charge) of the battery unit, such that the transport refrigeration unit may be powered for a minimally acceptable amount of time. The first threshold may at least 10%, at least 15%, at least 20% at least 25% or at least 30% of the capacity of the battery unit.

By disengaging the clutch when the power level is lower than the first threshold, the generation of electrical power using the generator may be prioritised over optimising the fuel consumption of the vehicle when driving the vehicle. This may help prevent the spoiling of goods being transported, and ensure that the TRU is adequately powered during transit of the vehicle.

The second threshold may be regarded as a relative, acceptable value for the power level of the battery unit being at capacity. The second threshold may be at least 80%, at least 85%, at least 90%, or at least 95% of the actual capacity of the battery unit.

The controller may be configured to monitor a fuel level of the vehicle. The controller may be configured to determine that the vehicle is in a sixth state and engage the clutch when the vehicle is in the sixth state, wherein the fuel level of the vehicle is below a first fuel threshold in the sixth state. In the sixth state, the power level of the battery unit may be greater than the first threshold.

The first fuel threshold may correspond to a value of: at least 10%, at least 15%, at least 20%, at least 25%, or at least 30% of the capacity of a fuel tank of the vehicle.

By engaging the clutch when the fuel level of the vehicle is determined to be below the first fuel threshold, the work done by the engine may be reduced as the generator is not driven by the engine. Accordingly the rate of fuel consumption of the engine may decrease, and fuel efficiency may improve. This may ensure that the vehicle is able to reach a refuelling station. Of course, if the power level of the battery is below the first threshold, then the clutch may be disengaged such that the TRU may be adequately powered.

The vehicle may comprise one or more sensors, each sensor configured to sense and/or measure one of the speed of the vehicle, the brake pedal position, the power level of the battery unit and the fuel level of the vehicle respectively, as required. The controller may be configured to receive a measurement and/or reading from each of the one or more sensors, as required.

The battery unit may be rechargeable. The battery unit may be configured to recharge when the electrical power supplied from the generator to the battery unit exceeds the power demand of the transport refrigeration unit. The battery unit may also be configured to be recharged via an electrical grid, e.g. when the vehicle is stationary.

The battery unit may comprise a power storage device, and the power storage device may itself be rechargeable. The power storage device may be a battery, a cell, a capacitor or the like, and may be a combination or plurality of these devices.

The power management system may comprise a plurality of power inverters. The plurality of power inverters may be configured to convert the electrical power generated by the generator to a desired frequency and/or voltage.

The plurality of power inverters may be configured to convert the electrical power generated by the generator to a voltage of: between 350V and 450V; between 360V and 440V; between 370V and 430V; between 380V and 420V; between 390V and 410V; or about 400V. The plurality of power inverters may be configured to convert the electrical power generated by the generator to a frequency of: between 35 Hz and 75 Hz; between 40 Hz and 70 Hz; between 45 Hz and 65 Hz; between 50 Hz and 60 Hz; or about 50 Hz. The converted electrical power may have a voltage of between 395V and 405V at 50 Hz, or may have a variable power by having a frequency varying between 40 Hz and 65 Hz at the aforementioned voltage.

The battery unit may comprise an AC/DC inverter (i.e. a rectifier), which may be configured to receive electrical power from the generator. The battery unit may comprise a DC/AC inverter, which may be configured to supply electrical power to the TRU. The battery unit may comprise a power storage device, which may be configured to receive electrical power from the AC/DC inverter, and may be configured to supply electrical power to the DC/AC inverter.

By providing a plurality of power inverters in combination with the generator, the power management system may be able to more efficiently transform mechanical energy harvested from the engine by the generator into a stable supply of electrical power for powering the TRU.

The battery unit may comprise a DC/DC converter, which may be connected to each of the power storage device, the AC/DC inverter and the DC/AC inverter. The DC/DC converter may connect the power storage device to the AC/DC inverter and the power storage device to the DC/AC inverter.

By combining a DC/DC converter in electrical communication with each of the AC/DC inverter, the DC/AC inverter and the power storage device, the power management system may be able to more efficiently relay electrical power generated by the generator to the TRU; recharge the energy storage device using the electrical power generated by the generator; and optionally supplement the electrical power generated by the generator with electrical power from the power storage device when powering the TRU.

The vehicle may be a rigid truck. The rigid truck may comprise a tractor. The rigid truck may comprise a container or storage space. The tractor and the container or storage space may be connected via a chassis.

The container or storage space may define a space or monitored environment in which goods may be transported. The TRU may be configured to regulate an environmental condition (e.g. humidity, temperature or the like) of the monitored environment.

The tractor may comprise the vehicle engine and may comprise a cab. The vehicle engine may be an internal combustion engine, such as a gas engine, a diesel engine or a hydrogen engine.

The rigid truck may be connected to a dolly trailer. The dolly trailer may be a trailer towed by the rigid truck. The dolly trailer may comprise a container or storage space which defines a space or monitored environment in which goods may be transported. The dolly trailer may comprise a dolly TRU. The power management system may be configured to supply electrical power to the TRU and the dolly TRU responsive to a power demand of the TRU and the dolly TRU, respectively.

The vehicle may be a tractor-trailer system. The generator may be located on or in the tractor. The TRU may be located on or in the trailer.

Viewed from a second aspect of the present invention, there is provided a method of powering a transport refrigeration unit, the method comprising: mechanically driving a generator using an engine, wherein the generator is mechanically connected to the engine; supplying electrical power generated by the generator to a battery unit; and supplying electrical power to the transport refrigeration unit using the battery unit, responsive to a power demand of the transport refrigeration unit.

By mechanically driving the generator using the engine, the generator being mechanically connected to the engine, the rate at which the generator generates electrical power will depend on a speed of the engine. Accordingly when the engine speed increases/decreases, the electricity generation rate of the generator will also correspondingly increase/decrease.

The method uses a battery unit to harvest the generated power, and to supply electrical power to the transport refrigeration unit (TRU) from the battery unit responsive to a power demand of the TRU. Consequently, the requisite power to maintain a desired output of the TRU can be met. That is, the method may facilitate the dynamic output of power as and when required by the TRU.

Accordingly, the TRU may be more reliable and/or effective in its regulating of an environment of a vehicle in which goods are transported (i.e. a portion of the vehicle regulated by the TRU) such that a condition of the goods may be reliably preserved.

The provision of a battery unit which is configured to supply power to the TRU responsive to a power demand of the TRU removes the need to provide a mechanism between engine and the generator which maintains a substantially constant, or sustained, generator speed (and hence a substantially constant, or sustained, electrical power output at the generator). As such, it is not necessary to provide mechanisms, such as a hydraulic mechanism, which maintains a constant speed output at the generator, when driven by the engine. Mechanically driving the generator by a mechanical connection to the engine rather than a hydraulic mechanism may have a number of advantages. For example, mechanically connecting the generator to the engine may be generally cheaper than a hydraulic connection, and hence the cost of the vehicle components may be reduced. Further, mechanical connections may be less complex in regards to their installation and/or maintenance when compared to hydraulic connections, and hence costs associated in each of these regards may also be reduced.

The method may comprise mechanically driving the generator using a power take-off. That is, the engine may comprise a power take off, and the engine may be configured to mechanically drive the generator via the power take-off. The power take-off may be a drive shaft connected to a rotor of the engine. The generator may be directly mechanically coupled to the power take-off.

The method may comprise receiving, using the battery unit, a variable supply of electrical power from the generator. As the generator is mechanically driven by the power take-off, the speed of the generator will be dependent on the speed of the power take-off (i.e. the engine speed). An electricity generation rate, i.e. a rate at which the generator generates electrical power, may depend on the engine speed. Generally, the generation rate may increase proportionally with the engine speed. Accordingly the generation rate of the generator may vary with the engine speed.

The generator may be coupled to the engine via a clutch, and may be coupled to the power take-off via the clutch. The clutch may be configured to decouple the generator from the engine when the clutch is engaged, and may be configured to couple the generator to the engine when the clutch is disengaged. The method may comprise controlling the clutch. The method may comprise monitoring a power level of the battery unit, and the method may comprise the step of controlling the clutch based on the power level of the battery.

By being able to engage or disengage the generator from the clutch, the generator may be decoupled from and/or coupled to the engine. This may avoid damage to the generator, or inefficient operation of the generator, which may otherwise decrease the operational lifetime of the generator. Further, in situations in which the generator need not be coupled to the power take-off, such as when the battery unit has above a threshold level of charge, the clutch may be engaged such that an amount of work the engine is required to perform may be reduced. Accordingly the rate at which the engine consumes fuel may be reduced. Further, decoupling the engine from the generator need not be of detriment to the operation of the TRU, as the battery unit will supply power to the TRU responsive to the power demand of the TRU.

It will be appreciated that the vehicle will be able to decouple the generator from the clutch without necessarily being of detriment to the provision of a stable source of power to the TRU, due to the battery unit. This is in contrast to prior art configurations, which require that the generator is always coupled to the engine e.g. via a hydraulic mechanism. Thus the method may be able to reduce an overall consumption of fuel by decoupling the generator from the engine at instances where the generator does not need to be coupled to the engine.

The TRU may be housed within a vehicle, the vehicle comprising the engine. Accordingly the TRU may be a TRU of the vehicle.

The method may comprise monitoring a speed of the vehicle. The method may comprise determining that the vehicle is in a first state and engaging the clutch when the vehicle is in the first state, wherein the speed of the vehicle is increasing in the first state.

The method may comprise determining that the vehicle is in a second state and disengaging the clutch when the vehicle is in the second state, wherein the speed of the vehicle is substantially constant in the second state.

When coupled to the engine the generator can be driven by the engine such that electrical power is generated. However, driving the generator using the engine increases the amount of work done by the engine, and accordingly a rate at which the engine consumes fuel may increase. During acceleration, engine fuel efficiency typically decreases, meaning that driving the generator during acceleration of the vehicle further reduces the effective fuel efficiency of the engine.

By monitoring if the speed of the vehicle is increasing, the method may involve selectively coupling or decoupling the generator from the engine via operation of the clutch. When the speed of the vehicle is substantially constant, i.e. the vehicle is not accelerating or decelerating, the vehicle may be in a suitable state for electricity to be generated, e.g. to power the TRU. However, when the speed of the vehicle is increasing the generator may be decoupled from the engine such that the amount of work done by the engine may decrease during acceleration of the vehicle, and hence fuel consumption during acceleration of the vehicle may also be reduced. As a result, the fuel efficiency of the vehicle may be increased.

Thus, in the first state the speed of the vehicle may be increasing, and in the second state, the speed of vehicle may not be increasing, i.e. it may be substantially constant or may be decreasing.

If the vehicle is decelerating or remains at constant speed due to driver intervention (i.e. braking, or braking when travelling downhill), it is desirable to generate energy using the generator as the work done by the engine during this time is reduced.

The method may therefore comprise monitoring if the vehicle is braking, for example by monitoring a brake pedal position of the vehicle. The method may comprise determining that the vehicle is in a third state and disengaging the clutch when the vehicle is in the third state, wherein the vehicle is braking (e.g. the brake pedal is engaged) in the third state.

Brake pedal position will be understood to be the position of the brake pedal of the vehicle. When the brake pedal is engaged, the braking system of the vehicle will be activated such that the vehicle system may decelerate, i.e. its rate of change of speed will be negative. During braking, energy is lost from the vehicle system. Rather than dissipating all the energy via friction in the brakes, the method may instead comprise disengaging the clutch such that energy which would otherwise be lost during braking may be instead be regenerated via the generator being driven by the engine. It will be appreciated that driving the generator using the engine when the vehicle is braking may provide a form of regenerative braking.

The method may comprise monitoring a power level of the battery unit. The method may comprise determining that the vehicle is in a fourth state and disengaging the clutch when the vehicle is in the fourth state, wherein the power level of the battery unit is below a first threshold in the fourth state. The method may comprise determining that the vehicle is in a fifth state and engaging the clutch when the vehicle is in the fifth state, wherein the power level of the battery unit is above a second threshold in the fifth state.

The method may comprise determining the vehicle to be in the fourth state regardless of if the speed of the vehicle is determined to be increasing. In this way, the adequate powering of the TRU may be prioritised over preserving the fuel efficiency of the vehicle.

Additionally, the method may comprise determining the vehicle to be in the third state even if the power level of the battery unit is greater than the second threshold. In this way, electrical power may be generated even if the battery unit is sufficiently charged. The power level of the battery unit may either be conserved, or any surplus electrical power may be delivered to and/or dissipated within other components of the vehicle. Accordingly electrical power may always be generated by the generator when it is not of detriment to the fuel efficiency of the vehicle.

The first threshold may be regarded as a minimally acceptable value for the power level (i.e. a state-of-charge) of the battery unit, such that the transport refrigeration unit may be powered for a minimally acceptable amount of time. The first threshold may at least 10%, at least 15%, at least 20% at least 25% or at least 30% of the capacity of the battery unit.

By disengaging the clutch when the power level is lower than the first threshold, the generation of electrical power using the generator may be prioritised over optimising the fuel consumption of the vehicle when driving the vehicle. This may help prevent the spoiling of goods being transported, and ensure that the TRU is adequately powered during transit of the vehicle.

The second threshold may be regarded as a relative, acceptable value for the power level of the battery unit being at capacity. The second threshold may be at least 80%, at least 85%, at least 90%, or at least 95% of the actual capacity of the battery unit.

The method may comprise monitoring a fuel level of the vehicle. The method may comprise determining that then vehicle is in a sixth state and engaging the clutch when the vehicle is in the sixth state, wherein the fuel level of the vehicle is below a first fuel threshold in the sixth state. In the sixth state, the power level of the battery unit may be greater than the first threshold.

The first fuel threshold may correspond to a value of: at least 10%, at least 15%, at least 20%, at least 25%, or at least 30% of the capacity of a fuel tank of the vehicle.

By engaging the clutch when the fuel level of the vehicle is determined to be below the first fuel threshold, the work done by the engine may be reduced as the generator is not driven by the engine. Accordingly the rate of fuel consumption of the engine may decrease, and fuel efficiency may improve. This may ensure that the vehicle is able to reach a refuelling station. Of course, if the power level of the battery is below the first threshold, then the clutch may be disengaged such that the TRU may be adequately powered.

The vehicle may comprise one or more sensors, each sensor configured to sense and/or measure one of the speed of the vehicle, the brake pedal position, the power level of the battery unit and the fuel level of the vehicle respectively, as required. The method may comprise receiving a measurement and/or reading from each of the one or more sensors, as required.

The method may comprise recharging the battery unit when a generation rate of the generator exceeds the power demand of the transport refrigeration unit. The method may also comprise recharging the battery unit via an electrical grid, e.g. when the vehicle is stationary.

The battery unit may comprise a plurality of power inverters. The method may comprise converting the electrical power generated by the generator to a desired frequency and/or voltage, using the plurality of power inverters.

The battery unit may comprise an AC/DC inverter (i.e. a rectifier), which may be configured to receive electrical power from the generator. The battery unit may comprise a DC/AC inverter, which may be configured to supply electrical power to the TRU. The battery unit may comprise a power storage device, which may be configured to receive electrical power from the AC/DC inverter, and may be configured to supply electrical power to the DC/AC inverter.

The method may comprise receiving electrical power from the generator using the AC/DC inverter. The method may comprise supplying electrical power from the AC/DC inverter to the power storage device. The method may comprise receiving electrical power from the power storage device using the DC/AC inverter. The method may comprise supplying electrical power to the TRU using the DC/AC inverter.

By using a plurality of power inverters in combination with the generator, the method may be able to more efficiently transform mechanical energy harvested from the engine by the generator into a stable supply of electrical power for powering the TRU.

The battery unit may comprise a DC/DC converter, which may be connected to each of the power storage device, the AC/DC inverter and the DC/AC inverter. The DC/DC converter may connect the power storage device to the AC/DC inverter and the power storage device to the DC/AC inverter.

The method may comprise supplying electrical power to the DC/DC inverter using the AC/DC inverter, and may also comprise supplying electrical power to the DC/AC inverter using the DC/DC converter. The method may comprise supplying electrical power to the power storage device using the DC/DC converter, and may also comprise receiving electrical power from the power storage device using the DC/DC converter.

By combining a DC/DC converter in electrical communication with each of the AC/DC inverter, the DC/AC inverter and the power storage device, the method of powering the TRU may be able to more efficiently relay electrical power generated by the generator to the TRU; recharge the energy storage device using the electrical power generated by the generator; and optionally supplement the electrical power generated by the generator with electrical power from the power storage device when powering the TRU.

The method may comprise using the vehicle of the first aspect, and accordingly the method may be a method of powering the TRU of the vehicle of the first aspect.

The method of the second aspect may have one or more or all of the features (including optional features) of the vehicle of the first aspect. Thus the above description of the vehicle of the first aspect may be equally applicable to the method of the second aspect.

BRIEF DESCRIPTION OF THE DRAWINGS

Certain preferred embodiments of the invention will now be described by way of example only and with reference to the accompanying drawings, in which.

DETAILED DESCRIPTION OF THE INVENTION

Figure 1:
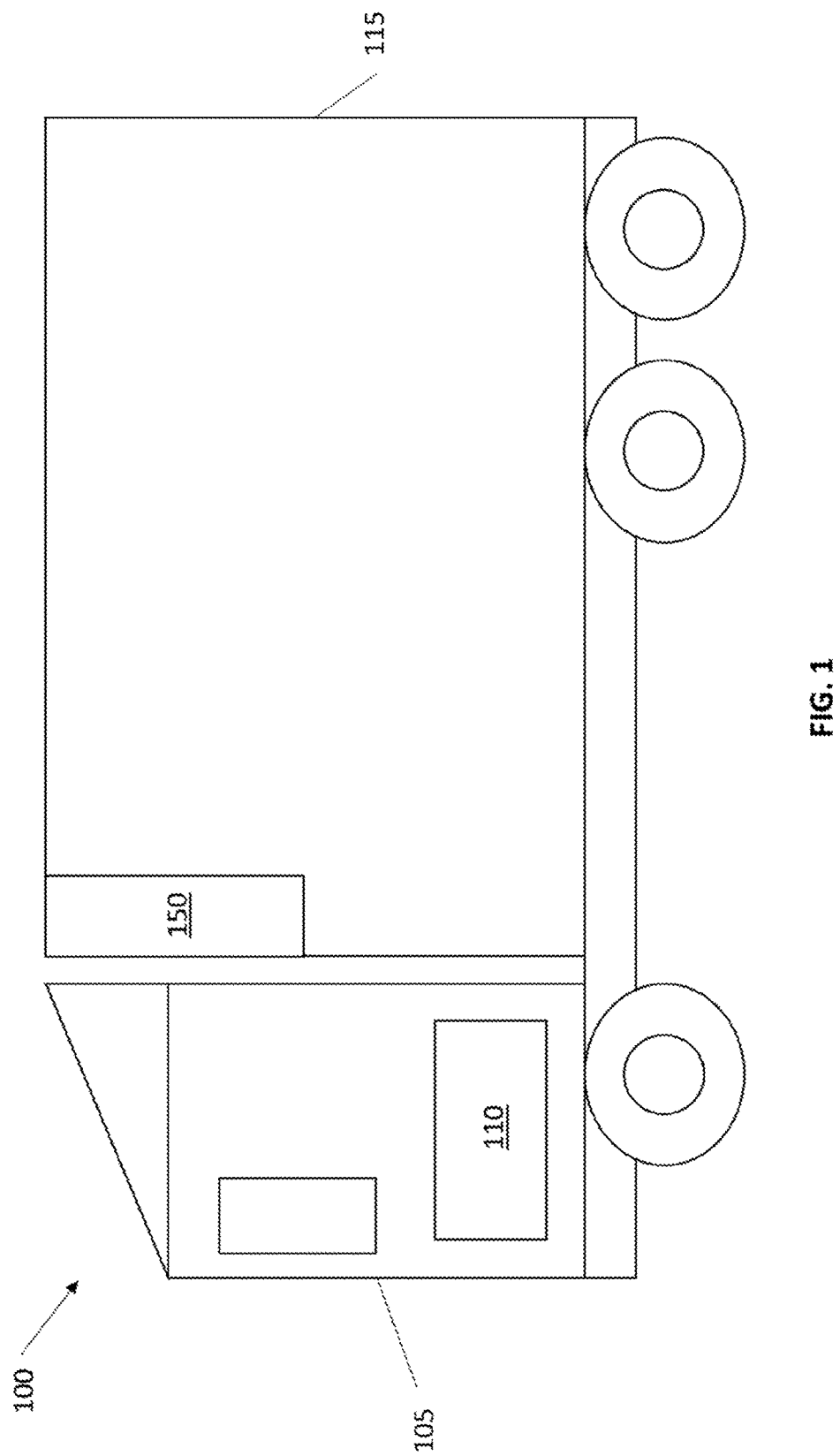
FIG. 1 shows a schematic diagram of a vehicle.

FIG. 1 shows a schematic representation of a vehicle 100, which in the present illustration is a rigid truck comprising a cabin 105 and a storage area 115. An engine 110 of the vehicle 100 is located under and/or towards the cabin 105, the engine 110 providing a motive force to the vehicle 100 such that it is capable of transport. The vehicle 100 also comprises a transport refrigeration unit (TRU) 150 located in communication with the storage area 115. The TRU 150 is configured to regulate the environment within the storage area 115, e.g. by controlling a temperature and a humidity within the storage area 115. The TRU 150 requires a stable power source such that the storage area 115 may be reliably regulated.

Figure 2:
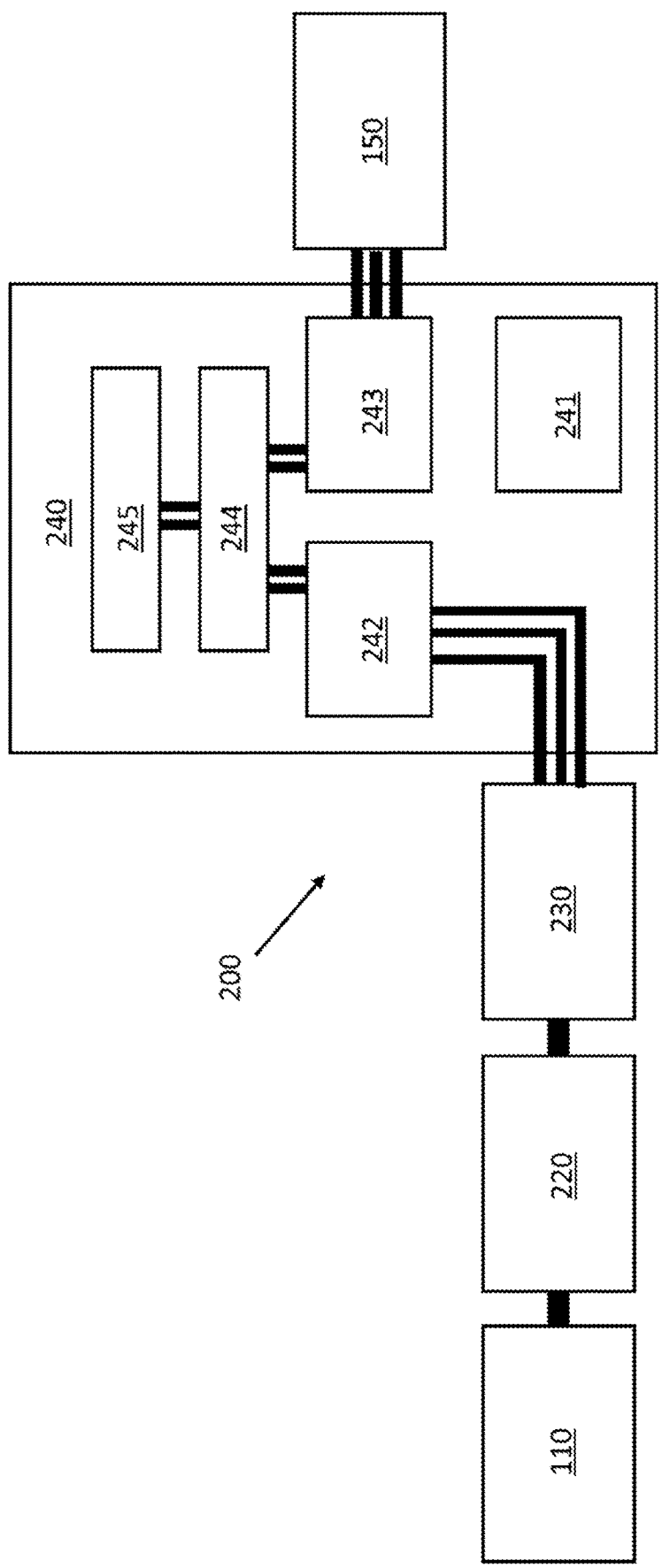
FIG. 2 shows a schematic diagram of a first power management system.

According to a first embodiment of the present invention, FIG. 2 shows a power management system 200 which is provided as the power source for the TRU 150. The power management system 200 comprises a generator 230 and a battery unit 240. The generator 230 is mechanically connected to the engine 110 via mechanical driving means. In the present embodiment, the mechanical driving means comprises a power take-off 220 connected to the engine 110, the power take-off 220 also coupled directly to the generator 230. The generator 230 is in electrical communication with the battery unit 240, which in turn is in electrical communication with the TRU 150.

The battery unit 240 comprises a controller 241, an AC/DC inverter 242, a DC/DC converter 244, a DC/AC inverter 243 and a battery 245. The AC/DC inverter 242 is connected to the generator 230.

The generator 230 is configured to generate electrical power when driven by the engine 110. The power take-off 220 transfers rotational energy from the engine 110 to the generator 230, which in turn is used to generate electrical power via the generator 230. The generator 230 is thus mechanically connected to and mechanically driven by the engine 110, and supplies generated electrical power to the battery unit 240. The speed of the engine 110 is variable during operation of the vehicle 100. As the generator 230 is directly coupled to the power take-off, the speed at which the generator 230 is driven at varies proportionally to the speed of the engine 110. The rate of electrical power generated by the generator 230 hence varies with the speed of the engine 110.

The AC/DC inverter 242 is in electrical communication with the generator 230, and hence receives electrical power generated by the generator 230. The AC/DC inverter 242 converts AC electrical power generated by the generator 230 to DC electrical power. The AC/DC inverter 242 is connected to the DC/DC converter 244, which receives DC electrical power from the AC/DC inverter 242 and steps up or down the voltage of the DC electrical power received. The DC/DC converter 244 then supplies DC electrical power to the DC/AC inverter 243, which converts DC electrical power into AC electrical power, to be supplied to the TRU 150. AC electrical power is supplied to the TRU 150 at 400V, with a frequency of 50 Hz in the present embodiment. However, in various embodiments the voltage and frequency of the AC electrical power supplied can vary.

The DC/DC converter 244 is also connected in parallel with a battery 245. Whilst in the present embodiment a battery 245 is provided in the battery unit 240, in various embodiments a capacitor, a cell or the like could be used in place of, or in combination with, the battery 245.

The battery unit 240 also supplies electrical power to the TRU 150 from the battery 245. The battery 245 supplies electrical power to the DC/DC converter 244, which will step up/down the voltage as required. The DC/DC converter 244 supplies converted DC electrical power to the DC/AC inverter 243, which inverts the DC electrical power into AC electrical power, to be supplied to the TRU 150.

There are hence three mechanisms by which the battery unit 240 is capable of supplying electrical power to the TRU 150: the battery unit 240 can supply electrical power generated by the generator 230 to the TRU 150; the battery unit 240 can supply electrical power from the battery 245 to the TRU 150; or the battery unit 240 can supply electrical power from both the generator 230 and the battery 245 to the TRU 150.

The battery unit 245 is therefore able to supply electrical power to the TRU 150 responsive to a power demand of the TRU 150. For example, if the generator 230 generates enough electrical power to meet the power demand of the TRU 150, then the TRU 150 may draw electrical power from the battery unit 240 supplied by the generator 230, without drawing electrical power from the battery 245. If the generator 230 does not generate enough electrical power to meet the power demand of the TRU 150, then the TRU 150 may draw electrical power from battery 245 and the generator 230. If the generator 230 is generating no electrical power, then the TRU 150 may draw electrical power solely from the battery 245 to meet the power demand of the TRU 150.

In this respect, the battery unit 240 of the present embodiment can be considered to 'smooth' out the electrical power supplied to the TRU 150 by the generator 230. As the generator 230 is not required to be a steady, or sustained, source of electrical power for the TRU 150, the generator 230 does not need to be driven by a mechanism which drives the generator 230 at a sustained speed. As such, the generator 230 is able to be mechanically coupled to and mechanically driven by a power take-off 220 of the engine 110, whilst the TRU 150 is still adequately powered during operation.

Providing a power management system 200 in accordance with the present embodiment enables a TRU 150 to be reliably powered when mechanical driving means are used to drive the generator 230. Mechanical driving means which do not sustain the speed at which the generator 230 is driven are generally less expensive than mechanisms which do sustain the speed at which the generator 230 is driven and thus the power management system 200, in combination with e.g. the power take-off, may be generally less expensive than systems currently available.

The mechanical driving means shown in FIG. 1 is a power take-off 220 of the engine 110 directly connected to the generator 230. In various embodiments, other mechanical driving means can be used. For example, an engine drive belt can also be used to drive the generator 230 via the engine 110.

Figure 3:
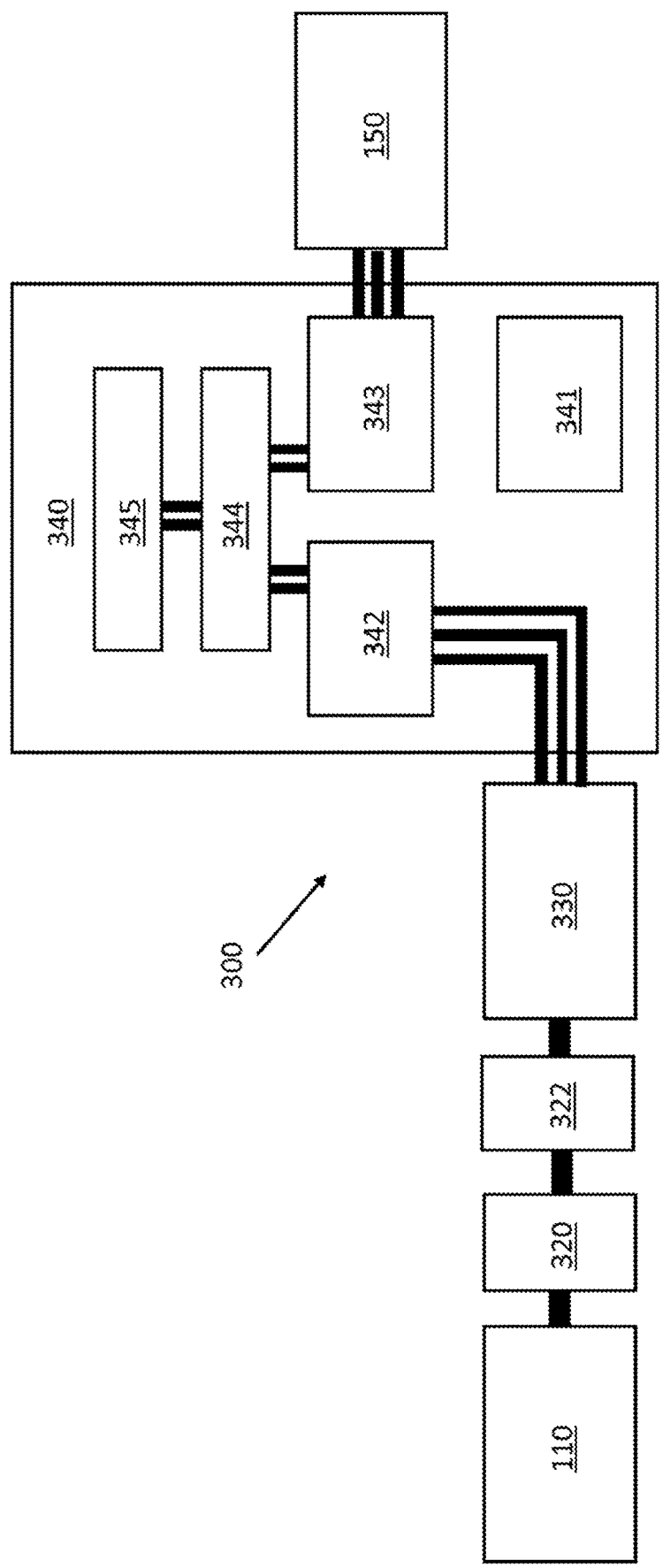
FIG. 3 shows a schematic diagram of a second power management system.

FIG. 3 shows a schematic representation of a second power management system 200, according to an alternative embodiment of the present invention. The architecture of the power management system 300 is the same as that of the embodiment shown in FIG. 2, except that the mechanical driving means comprises a gearing arrangement 322 located between the power take-off 320 and the generator 330. The gearing arrangement 322 is coupled to the power take-off 320 of the engine 110, and is also coupled to the generator 330.

In the present embodiment, the gearing arrangement 322 has a 1:2 gear ratio. The gearing arrangement 322 therefore doubles the speed at which the generator 330 is driven at, relative to the speed of the engine 110.

The generator 330 requires driving at a speed greater than a minimum speed threshold to ensure that electrical power is generated. The lowest speed that the generator 330 will be driven at by the engine 110, when in use, is the idle speed of the engine 110. The gearing arrangement 322 of the present embodiment is therefore configured to drive the generator 330 above its minimum speed threshold when the engine 110 is idling. Whilst the exemplary embodiment uses a 1:2 gear ratio, other gear ratios may be used, based on the specific operational speed range of the engine 110 and of the generator 330.

In some embodiments, the gearing arrangement 322 may have a controllable gear ratio, where the gear ratio is controlled based on a rotational speed of the engine 310, for example by the controller 341. This may be advantageous where the operational range of the engine 110 is greater than that of the generator 330.

Figure 4:
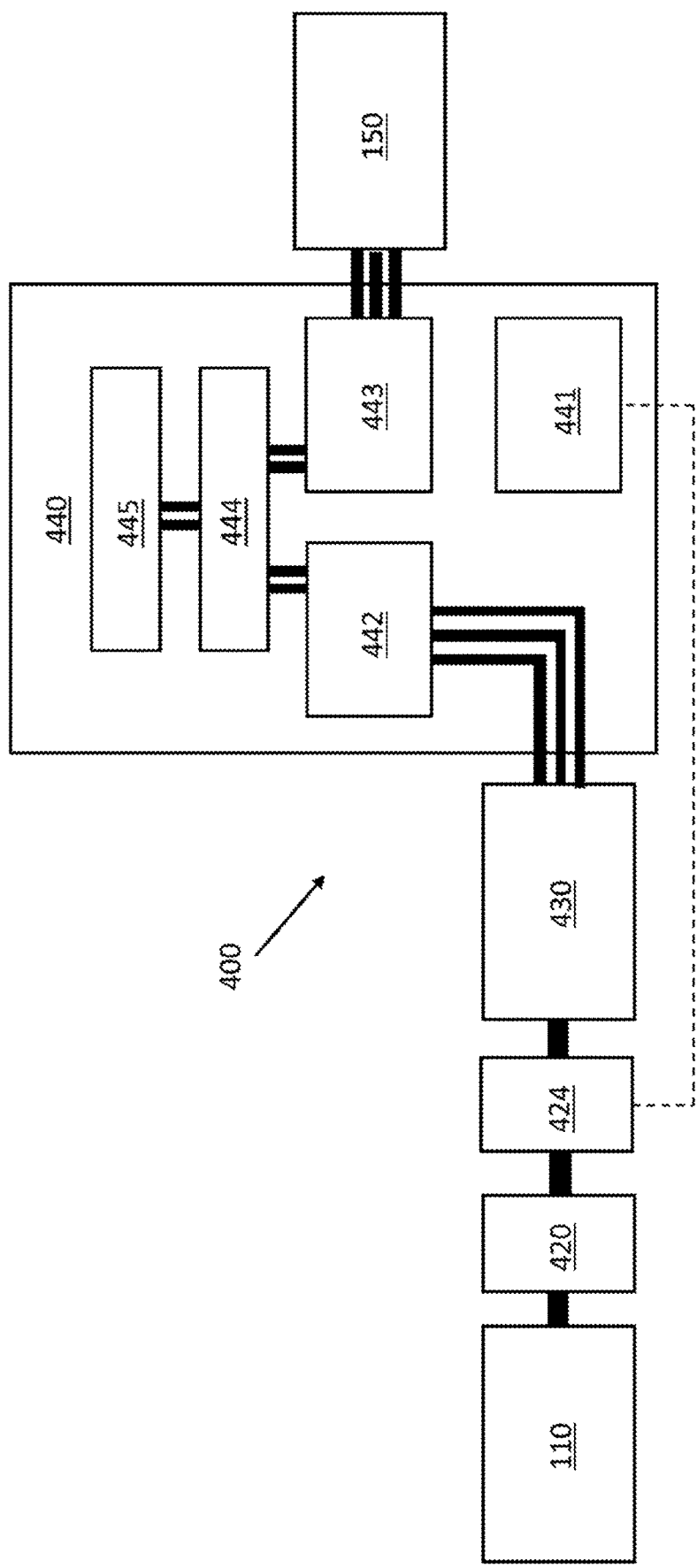
FIG. 4 shows a schematic diagram of a third power management system.

FIG. 4 shows a schematic representation of a vehicle 100 comprising an engine, a TRU 150 and a third power management system 400, according to a further alternative embodiment of the present invention. The architecture of the power management system 400 is the same as that of the embodiments shown in FIG. 1 and FIG. 2, except that the mechanical driving means comprises a clutch 424 in combination with the power take-off 420. The generator 430 is coupled to the power take-off 420 via the clutch 424.

The controller 441 of the power management system 400 is in communication with the clutch 424. Via the controller 441, the power management system 400 operates the clutch 424 such that the clutch 424 is either engaged or disengaged. When the clutch 424 is engaged, the generator 430 decouples from the power take-off 420, and when the clutch 424 is not engaged, the generator 430 is coupled to the power take-off 420. By using the clutch 424, the generator 430 can therefore be selectively coupled to or decoupled from the engine 110.

Whilst in the embodiment shown in FIG. 4 the mechanical driving means comprises only a power take-off 420 and a clutch 424, in various embodiments the mechanical driving means may also comprise a gearing arrangement, such as that shown in FIG. 3. The gearing arrangement and the clutch 424 can be provided between the power take-off 420 of the engine and the generator 430, in any order.

In each of the embodiments shown in FIG. 1, FIG. 2 and FIG. 3, the battery 245, 345, 445 is rechargeable. The battery 245, 345, 445 can be recharged at least using the electrical power generated by the generator 230, 330, 430. For example, when the generation rate of the generator 230, 330, 430 exceeds the power demand of the TRU 150, any surplus electrical power can be used to recharge the battery 245, 345, 445. When the battery 245, 345, 445 is fully charged, any surplus electrical power can be dissipated within the power management system 200, 300, 400 and/or the TRU 150. Accordingly a power level of the battery 245, 345, 445 can be maintained, such that the battery 245, 345, 445 can reliably supply electrical power to the TRU 150 when the power demand of the TRU 150 exceeds the generation rate of the generator 230, 330, 430. Optionally, the battery 245, 345, 445 can also be recharged using a mains connection, e.g. using electrical power from an electric grid when the vehicle 100 is stationary.

Driving the generator 230, 330, 430 using the engine 110 increases the work done by the engine 110. As a result, a rate of fuel consumption of the engine 110 will increase when the engine 110 is driving the generator 230, 330, 430. However, as the power management system 200, 300, 400 comprises the battery 245, 345, 445, it is not necessary for the generator 230, 330, 430 to be always driven by the engine 110 when the TRU 150 is operating. Instead, the generator 230, 330, 430 can be decoupled from the engine 110, and the battery 245, 345, 445 can be used to solely power the TRU 150 in certain conditions.

Turning again to the embodiment shown in FIG. 4, the controller 441 is configured to determine a state of the vehicle 100, and the controller 441 is configured to operate the clutch 424 depending on the determined state of the vehicle 100. Thus if the vehicle 100 is in a state in which one or more conditions are met, the controller 441 will operate the clutch 424 such that the generator 430 decouples from/couples to the engine 110. Accordingly the fuel efficiency of the vehicle 100 may be improved, compared to a vehicle where the generator is always driven by the engine 110.

To determine the state of the vehicle 100, the controller 441 is configured to receive one or more operating parameters from the vehicle 100 relating to the operation of the vehicle 100. These include a speed of the vehicle 100, and if a brake pedal is engaged/depressed by a driver of the vehicle 100.

When the speed of the vehicle 100 is increasing (i.e. the vehicle is accelerating), the rate of work performed by the engine 110 naturally increases as it is required to provide a greater motive force to the vehicle 100. Accordingly, the rate of fuel consumption of the engine 110 also increases. If the engine 110 is used to drive the generator 430 during acceleration of the vehicle 100, the rate of fuel consumption of the vehicle 100 further increases.

The controller 441 is configured to engage the clutch 424 when the vehicle 100 is determined to be in a first state in which the vehicle 100 is accelerating, and where the generation of electrical power using the generator 430 is not necessary at that time. Accordingly, when the vehicle 100 is determined to be in the first state, the work required by the engine 110 can be reduced compared to if the engine 110 were to simultaneously drive the generator 430 and drive the vehicle 100 such that it was accelerating. The fuel efficiency of the engine 110 may improve as a result.

The controller 441 is configured to disengage the clutch 424 when the vehicle 100 is determined to be in a second state in which the speed of the vehicle 100 is substantially constant, and where the battery 445 is not fully charged. When the speed of the vehicle 100 is constant, the total work done required by the engine 110 is not as great as when the vehicle 100 is accelerating, and therefore coupling the generator 430 to the engine 110 at this time is not of increased detriment to the fuel efficiency of the engine 110.

Additionally, when the vehicle 100 is braking, the rate of work performed by the engine 110 naturally decreases as it is not necessarily required to provide a motive force to the vehicle 100. It is therefore desirable to drive the generator 430 using the engine 110 when the vehicle 100 is braking, as the total work required by the engine 110 is reduced at this stage. In other words, when the vehicle 100 is braking the increase to the rate of fuel consumption as a result of driving the generator 430 may be minimal.

The controller 441 is therefore configured to disengage the clutch 424 when the vehicle 100 is determined to be in a third state in which the vehicle 100 is braking, and where the battery 445 is not fully charged.

Ideally when the vehicle 100 is accelerating the generator 430 will be ideally coupled from the engine 110, and when the vehicle 100 is braking the generator 430 will be coupled to the engine 110. However, there are also a number of other conditions which in various embodiments may be considered by the controller 441 of the power management system 400, such that the battery 445 is always sufficiently charged to ensure that the TRU 150 can be adequately powered.

In the present embodiment, the controller 441 is therefore configured to monitor a power level of the battery 445. If the power level of the battery 445 is low, or is below a first threshold (i.e. 40% capacity in the present embodiment), powering the TRU 150 and/or recharging the battery 445 using electrical power generated by the generator 430 should be prioritised. Similarly, if the power level of the battery 445 is high, or is above a second threshold (i.e. 90% capacity in the present embodiment), then decoupling the generator 430 from the engine 110 to preserve fuel, and powering the TRU 150 using only the battery 445, should be prioritised.

The controller 441 is configured to disengage the clutch 424 when the vehicle 100 is determined to be in a fourth state in which the power level of the battery 445 is below the first threshold. Thus when the battery 445 is not sufficiently charged, or is at low power, the generator 430 can be coupled to the engine 110 and the battery 445 can be recharged/the power level of the battery 445 can be conserved by supplying power to the battery unit 445 via the generator 430.

The controller 441 is configured to engage the clutch 424 when the vehicle 100 is determined to be in a fifth state in which the power level of the battery 445 is above the second threshold. Thus when the battery 445 is sufficiently charged, the generator 430 can be decoupled from the engine and the fuel efficiency of the vehicle 100 may be improved.

The controller 441 is also configured to monitor a fuel level of the vehicle 100. The controller is configured to engage the clutch 424 when the vehicle 100 is determined to be in a sixth state, wherein the fuel level of the vehicle 100 is below a first fuel threshold (i.e. 20% capacity) in the sixth state and the power level of the battery 445 is not below the first threshold. By engaging the clutch 445 in the sixth state, the generator 430 can decouple from the engine 110 and hence reduce the work done required by the engine 110. The fuel efficiency of the engine 110 can improve as a result, and the remaining fuel of the engine 110 can be conserved. Of course, if the battery 445 is not sufficiently charged, the clutch 445 can remain disengaged such that the TRU 150 is still adequately powered.

What is claimed is:

1. A vehicle for transporting goods, the vehicle comprising:
    a transport refrigeration unit;
    an engine; and
    a power management system comprising:
        a battery unit electrically connected to the transport refrigeration unit; and
        a generator mechanically connected to the engine, the generator being configured to be mechanically driven by the engine and to supply electrical power to the battery unit;
    wherein the power management system is configured to supply electrical power to the transport refrigeration unit from the battery unit responsive to a power demand of the transport refrigeration unit;
    wherein the generator is coupled to the engine via a clutch, and wherein the power management system is configured to selectively engage and/or disengage the clutch, such that the generator selectively decouples from and/or couples to the engine;
    wherein the power management system comprises a controller configured to monitor a speed of the vehicle;
    wherein the controller is configured to determine that the vehicle is in a first state and engage the clutch when the vehicle is in the first state, wherein the speed of the vehicle is increasing in the first state; and
    wherein the controller is configured to determine that the vehicle is in a second state and disengage the clutch when the vehicle is in the second state, wherein the speed of the vehicle is substantially constant in the second state.

2. A vehicle as claimed in claim 1, wherein the engine comprises a power take-off, and wherein the engine is configured to mechanically drive the generator via the power take-off.

3. A vehicle as claimed in claim 1, wherein the generator is coupled to the engine via a variable gearing arrangement.

4. A vehicle as claimed in claim 1, wherein the controller is configured to monitor a brake pedal position of the vehicle; and
    wherein the controller is configured to determine that the vehicle is in a third state and disengage the clutch when the vehicle is in the third state, wherein the brake pedal is engaged in the third state.

5. A vehicle as claimed in claim 1, wherein the controller is configured to monitor a power level of the battery unit;
    wherein the controller is configured to determine that the vehicle is in a fourth state and disengage the clutch when the vehicle is in the fourth state, wherein the power level of the battery unit is below a first threshold in the fourth state.

6. A vehicle as claimed in claim 1, wherein the battery unit is rechargeable; and
    wherein the battery unit is configured to recharge when the electrical power supplied from the generator to the battery unit exceeds the power demand of the transport refrigeration unit.

7. A vehicle as claimed in claim 1, wherein the battery unit comprises:
    an AC/DC inverter configured to receive electrical power from the generator;
    a DC/AC inverter configured to supply electrical power to the transport refrigeration unit; and
    a power storage device configured to receive electrical power from the AC/DC inverter, and supply electrical power to the DC/AC inverter.

8. A vehicle as claimed in claim 7, wherein the battery unit comprises a DC/DC converter connected to each of the power storage device, the AC/DC inverter, and the DC/AC inverter.

9. A vehicle as claimed in claim 1, wherein the vehicle is a rigid truck.

10. A vehicle as claimed in claim 1, wherein the controller is configured to monitor a power level of the battery unit;
    wherein the controller is configured to determine that the vehicle is in a fifth state and engage the clutch when the vehicle is in the fifth state, wherein the power level of the battery unit is above a second threshold in the fifth state.

* * * * *